United States Patent
Gadepalli et al.

(10) Patent No.: US 10,242,214 B2
(45) Date of Patent: Mar. 26, 2019

(54) DYNAMIC CHANGE IN PLURALITY OF SECURITY LAYERS BASED ON PROJECTED RISK

(71) Applicant: INTERNATIONAL BUSINESS MACHINES CORPORATION, Armonk, NY (US)

(72) Inventors: Venkata V. Gadepalli, Apex, NC (US); Trudy L. Hewitt, Cary, NC (US); Ashok K. Iyengar, Encinitas, CA (US); James M. Moreno, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/297,275

(22) Filed: Oct. 19, 2016

(65) Prior Publication Data

US 2018/0107833 A1  Apr. 19, 2018

(51) Int. Cl.
*G06F 21/62* (2013.01)
*G06F 21/32* (2013.01)
*G06F 21/31* (2013.01)

(52) U.S. Cl.
CPC ........ *G06F 21/6218* (2013.01); *G06F 21/316* (2013.01); *G06F 21/32* (2013.01); *G06F 2221/2111* (2013.01)

(58) Field of Classification Search
CPC .... G06F 21/6218; G06F 21/316; G06F 21/32; G06F 2221/2111
See application file for complete search history.

(56) References Cited

U.S. PATENT DOCUMENTS

| 5,544,321 A * | 8/1996 | Theimer | G06F 21/35 380/258 |
| 7,079,652 B1 * | 7/2006 | Harris | G06F 21/31 340/539.13 |
| 7,797,732 B2 * | 9/2010 | Tam | G06F 21/10 709/205 |

(Continued)

OTHER PUBLICATIONS

IBM (OpenAFS Administration Guide, 460 pages, Apr. 2000).*

(Continued)

*Primary Examiner* — Oleg Korsak
(74) *Attorney, Agent, or Firm* — Schmeiser, Olsen & Watts; David Woycechowsky

(57) ABSTRACT

A method and associated system. Before allowing a user to use a secured resource, a first security check may be performed with respect to the user and/or the secured resource to determine whether a first security condition is satisfied. In response to a first security condition being satisfied, allowing the user to use the secured resource. In response to failing to satisfy the at least one first security condition, performing a second security check on the user with a second security condition. In response to passing a second security condition, allowing the user to use the secured resource. The first security condition may include a dynamic evaluation of at least one available data point to calculate a projected security risk of the user using the secured resource and the level of complexity of the second security condition may be set based on the calculated projected security risk.

19 Claims, 7 Drawing Sheets

(56) References Cited

U.S. PATENT DOCUMENTS

| | | | |
|---|---|---|---|
| 2011/0126273 A1* | 5/2011 | Bhatia | G06F 21/31 726/7 |
| 2012/0158563 A1* | 6/2012 | Song | G06Q 40/02 705/35 |
| 2014/0020072 A1 | 1/2014 | Thomas | |
| 2015/0095655 A1 | 4/2015 | Sherman | |
| 2016/0057148 A1 | 2/2016 | Micucci et al. | |

OTHER PUBLICATIONS

Zhang et al. (Dynamic Context-aware Access Control for Grid Applications, 2003 IEEE, 8 pages) (Year: 2003).*
Netclearance (/blog/2015/11/23/using-offline-analytics-to-build-your-business, Nov. 23, 2015, 4 pages) (Year: 2015).*

* cited by examiner

US 10,242,214 B2

DYNAMIC CHANGE IN PLURALITY OF SECURITY LAYERS BASED ON PROJECTED RISK

TECHNICAL FIELD

The present invention relates to dynamically performing security authorization to allow a user to access a security resource.

BACKGROUND

Secured resources (e.g. mobile phones, data, tools, devices, security systems, vehicles, or other valuable resource) may require security authorization in order to be accessed or used. Without security authorization, unauthorized users may dubiously access the secured resources and cause considerable damage. For example, if an unauthorized user accesses the mobile phone of another person, the unauthorized user may view, steal, destroy, and/or otherwise violate the property of a legitimate owner. The legitimate owner may use a relatively simple security authorization protocol, which is convenient for the user to access the secured resource.

However, a simple security authorization protocol may be relatively easy for an unauthorized user to violate. In other words, a convenient security authorization protocol may be desirable for a user, at the expense of being less secure, thus increasing the risk of a secured resource being substantially violated. On the flip side, if a security authorization protocol has a high level of security, such a high level of security may render the secured resource inconvenient to a user, although it may be more difficult for an unauthorized user to abuse the secured resource.

For example, if a user's mobile phone always requires a complex code and/or biometric input every time the user wishes to access the user's mobile phone, the mobile phone may at least partially lose its utility or utilization of the mobile phone may be limited. Accordingly, there is a long felt need to balance the convenience of a user's ability to access a secured resource without substantially sacrificing security on the secured resource.

SUMMARY

Embodiments of the present invention relate to a method, and associated computer system and computer program product. A request is received from a user to use a secured resource. Before allowing the user to use the secured resource, a first security check is performed with respect to the user and/or the secured resource to determine whether at least one first security condition is satisfied. In response to the user and/or the secured resource satisfying the at least one first security condition, the user is allowed to use the secured resource. In response to the user and/or the secured resource failing to satisfy the at least one first security condition, a second security check is performed on the user with at least one second security condition. In response to the user passing the at least one second security condition, the user is allowed to use the secured resource.

DETAILED DESCRIPTION

Figure 1A:
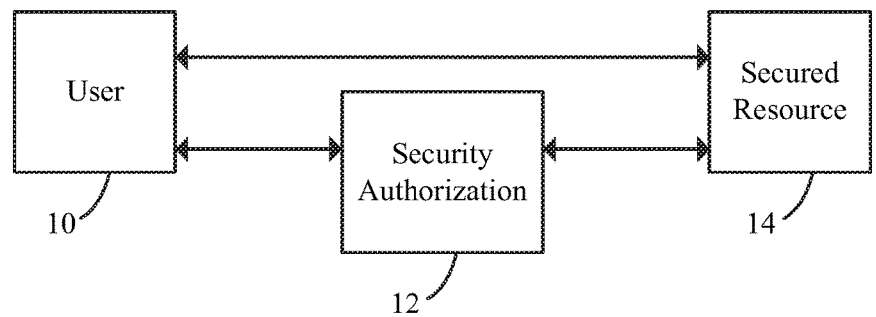
FIGS. 1A through 1F illustrate a user accessing a secured resource using a security authorization, in accordance with embodiments of the present invention.

FIG. 1A illustrates user 10 accessing a secured resource 14 using a security authorization 12, in accordance with embodiments of the present invention. If a user 10 attempts to access secured resource 14 (e.g., data, a tool, a device, a security system, a vehicle, etc.), security authorization 12 may be required in order for user 10 to be allowed to access secured resource 14. There are multiple layers of security authorization 12 ranging from a simple passcode to complex biometrics to multiple levels of security that may be implemented to allow a user 10 to access a secured resource 14. Embodiments relate to the ability to dynamically evaluate at least one available data point to calculate a projected security risk of an unauthorized user attempting to access secured resource 14 and implement appropriate levels of security authorization 12 based on the projected security risk. For example, if user 10 is in a safe environment then a relatively low level of security authorization 12 may be required to access secured resource 14, while if user 10 is in a relatively vulnerable environment then a relatively high level of security authorization 12 may be required to access secured resource 14.

User 10 may prefer a relatively low level security authorization 12 as a matter of convenience. For example, a relatively low level security authorization 12 may unlock a mobile phone (as an example secured resource 14) by entering a four digit pin code on a touch screen. However, such a relatively low level security authorization 12 may leave user 10 and/or secured resource 14 vulnerable to unauthorized access from an unauthorized user. For example, an unauthorized user may be able to dubiously determine the four digit pin code by spying on user 10 entering their four digit pin code on a previous occasion. If the unauthorized user steals the mobile phone of user 10 with knowledge of the four digit pin code, then the unauthorized user may be able to cause significant damage to user 10 and/or secured resource 14. For example, the unauthorized user may be able to access private information, destroy information, steal money, and/or perform other immoral activities on that secured resource 14 (e.g. a mobile phone) that are desirable to be prevented. Accordingly, a preference of user 10 to have a relatively low level of security authorization 12 has the downside that such a convenience may come at the expense of secured resource 14 being vulnerable to damage caused by unauthorized access. One of ordinary skill in the art would appreciate other types of secured resources 14 that would require security authorization 12 in order for user 10 to be allowed to have access to secured resource 14 other than the illustrative example of a mobile phone.

A relatively high level of security authorization 12 has the disadvantage of being inconvenient for user 10 gaining access to secured resource 14 even when user 10 is trying to access secured resource in a relatively safe set of circumstances. This inconvenience may impede user 10 from using secured resource 14 effectively, which may reduce the legitimate utility of secured resource 14. For example, when user 10 is in their private residence (presumably a relatively safe environment), the risk of an unauthorized user gaining access to secured resource 14 is relatively low. As a comparatively opposite example, when user 10 is in a busy shopping mall surrounded by thousands of strangers (presumably a relatively unsafe environment), the risk of an unauthorized user gaining access to secured resource 14 is relatively high. As a comparatively intermediate example, when user 10 is at a private party with friends, the risk of an unauthorized user gaining access to secured resource is relatively moderate (e.g. more risky than at their private residence but less risky than at a busy shopping mall).

In example embodiments, circumstances of user 10 may be dynamically evaluated to calculate a projected security risk of an unauthorized user attempting to access secured resource 14 and implement an appropriate level of security authorization 12 based on the projected security risk. For example, when user 10 is at their private residence, their mobile phone (e.g. an example secured resource 14) may require convenient security authorization 12 of a simple four digit pin code or maybe no security authorization at all. However, when user 10 moves to a busy shopping mall their mobile phone may dynamically calculate a higher risk of unauthorized access and require a more secure/inconvenient biometric input as security authorization 12. In this example, user 10 may dynamically balance having the convenience of easy access to their mobile phone in a relatively secure environment and having the safety of higher security in a relatively insecure environment.

Embodiments relate to the dynamic evaluation of data points to calculate projected risk, since the security circumstances of user 10 are unlikely to be static and/or rigid. There may be a multitude of factors that may contribute to a dynamic evaluation of a projected security risk. For example, in embodiments, it may be dynamically calculated that user 10 is in a relatively secure set of circumstances (i.e. the risk of unauthorized access is relatively low) when user 10 is at their private residence in proximity to their close family members if that matches a regular pattern of behavior. As a comparative example, it may be dynamically determined that a mobile phone (an example secured resource 14) is in a relatively insecure set of circumstances (i.e. the risk of unauthorized access is relatively high) when mobile phone is at the private residence of user 10, but their close family members of user 10 are not in close proximity. This example of a relatively insecure set of circumstances may be a dynamic calculation that indicates that user 10 forgot their mobile phone (an example secured resource 14) at their home, leaving their mobile phone vulnerable to unauthorized access from a burglar while user 10 is separated from their mobile phone. Of course, this is a non-limiting illustrative example.

In embodiments, any data points that can be used to calculate a projected security risk may be used to adjust the level of security authorization 12 for user 10 to access secured resource 14. Patterns of behavior of user 10 or patterns of circumstances of secured resource 14 may be used to dynamically calculate security risk. However, patterns of behavior of user 10 may not always be able to be rigidly applied, since human behavior is not static (i.e. human behavior is somewhat unpredictable) and security circumstances of user 10 and/or secured resource 14 may be dynamically changing. Embodiments allow user 10 to have convenient access to secured resource 14 with relatively simple security authorization 12 in relatively secure environments, which may dynamically change to stronger/inconvenient security authorization 12 in relatively insecure environments, thus allowing user 10 to dynamically have the best of both worlds.

Figure 1B:
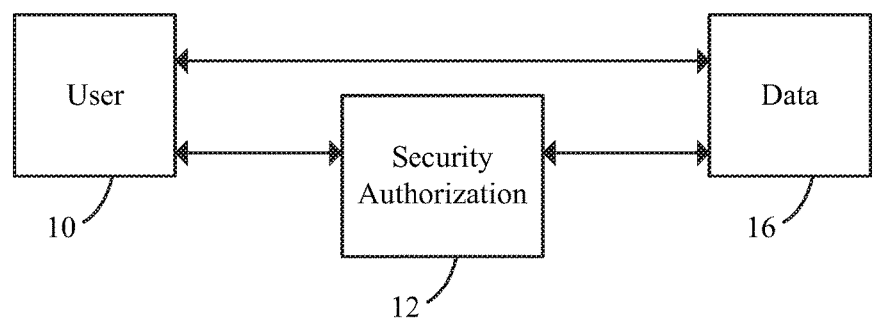

For example, in FIG. 1B, a user 10 may be required to have security authorization 12 to access data 16, in accordance with embodiments. In embodiments, data 16 may be located on a local device, a remote storage device, a server, and/or in a cloud computing environment. Data 16 may be sensitive and/or otherwise include information for which access should be prohibited by unauthorized users. For example, data may include sensitive personal information, sensitive business information, sensitive government information, medical records, copyrighted media, and/or any other data that may be desirable to keep secured as would be appreciated by one of ordinary skill in the art. User 10 may access data 16 through a mobile device, a portable computer, a stationary computer, a public computer terminal, a media player, a safe, and/or any other device or system that would allow user 10 to access data 16 as would be appreciated by one of ordinary skill in the art. Embodiments relate to the ability to dynamically evaluate at least one available data point to calculate a projected security risk of an unauthorized user attempting to access data 16.

Figure 1C:
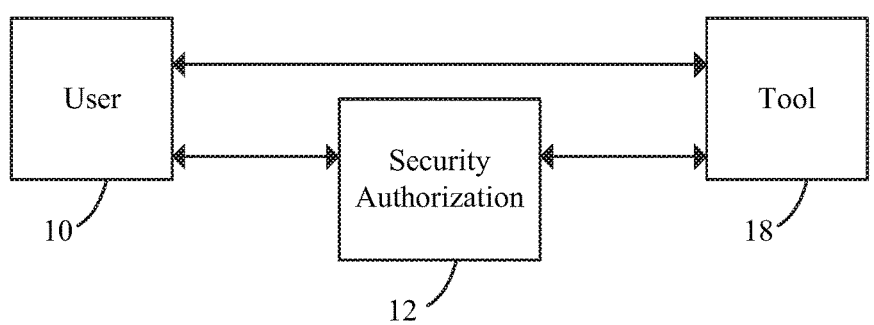

For example, in FIG. 1C, user 10 may be required to have security authorization 12 to access tool 18, in accordance with embodiments. For example, tool 18 may be hardware or software tool that has the potential for being dangerously operated, thus requiring security authorization 12 in order to be accessed. For example, tool 18 may be an item of construction equipment that has limitations on when and how it should be operated, thus requiring security authorization 12 in order to be accessed. Tool 18 may be hardware or software that is leased and should only be operated at certain times or conditions by user 10, thus requiring security authorization. One of ordinary skill in the art would appreciate a variety of tools 18 which would require security authorization 12 in order for a 10 to be allowed use of tool 18. One of ordinary skill in the art would appreciate a variety of reasons for security authorization 12 to be required for a user to access tool 18, whether tool 18 is a virtual tool or a hardware tool. Embodiments relate to the ability to dynamically evaluate at least one available data point to calculate a projected security risk of an unauthorized user attempting to access tool 18.

Figure 1D:
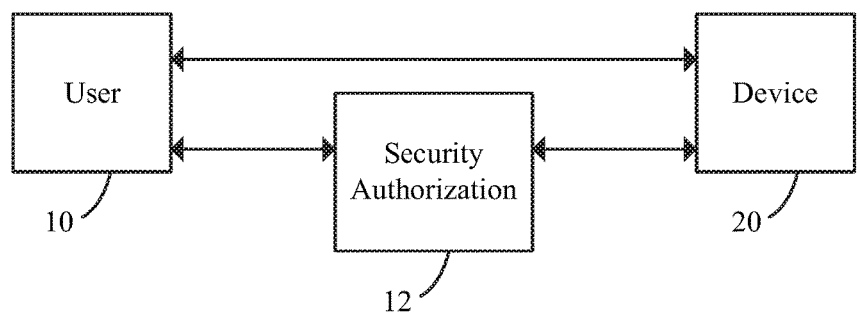

For example, in FIG. 1D, user 10 may be required to have security authorization 12 to access a device 18, in accordance with embodiments. For example, device 20 may be a mobile phone, computer system, vending machine, office equipment, medical equipment, military equipment, weapons, or any other device 20 that one of ordinary skill in the art would appreciate could require security authorization 12 in order to be accessed by user 10. One of ordinary skill in the art would appreciate a variety of reasons why security authorization 12 would be required for user 10 to access device 20. Embodiments relate to the ability to dynamically evaluate at least one available data point to calculate a projected security risk of an unauthorized user attempting to access device 20.

Figure 1E:
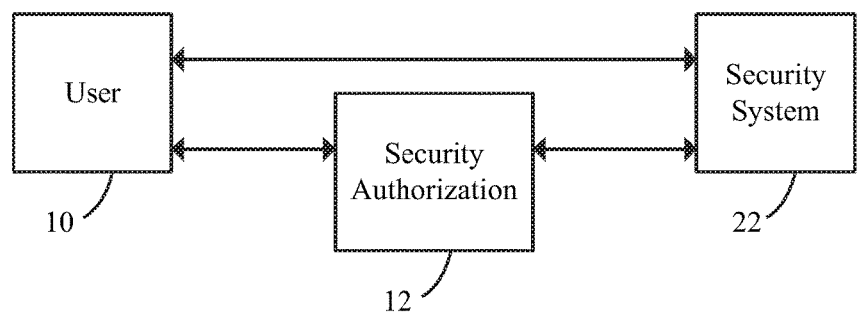

For example, in FIG. 1E, user 10 may be required to have security authorization 12 to operate a security system 22, in accordance with embodiments. For example, security system 22 may be a home security system by which the security procedures can be modified by user 10 if user 10 is allowed access to security system 22. It may be important for there to be appropriate security authorization 12 in order for a user to be allowed to make any changes to security features, in the event that an unauthorized user attempts to circumvent security system 22. In embodiments, security system 22 may need different levels of security depending on underlying circumstances, such as time of day, weekends versus weekdays, holidays, heightened levels of security due to contemporary events, or any other underlying circumstances which would be appreciated by one of ordinary skill in the art. Security system 22 may be any kind of security system, whether it be for physical premises, software, physical articles, or any other kind of security system appreciated by one of ordinary skill in the art. Embodiments relate to the ability to dynamically evaluate at least one available data point to calculate a projected security risk of an unauthorized user is attempting to manipulate security system 22.

Figure 1F:
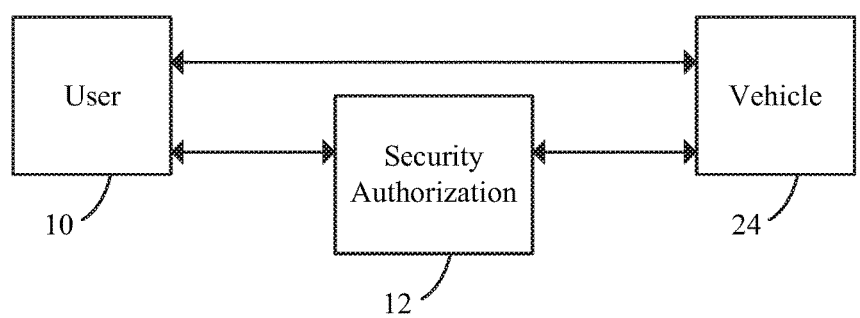

For example, in FIG. 1F, user 10 may be required to have security authorization 12 to operate vehicle 24, in accordance with embodiments. For example vehicle 24 may be an automobile which has the risk of being stolen or damaged by an unauthorized user. Even if an unauthorized user has a key to vehicle 24 (e.g. car, bike, airplane, or other vehicle), there may be circumstances that can be identified that use of the key is not performed by an authorized user. Embodiments relate to the ability to dynamically evaluate at least one available date point to calculate a projected security risk of an unauthorized user attempting to access vehicle 24.

Figure 2:
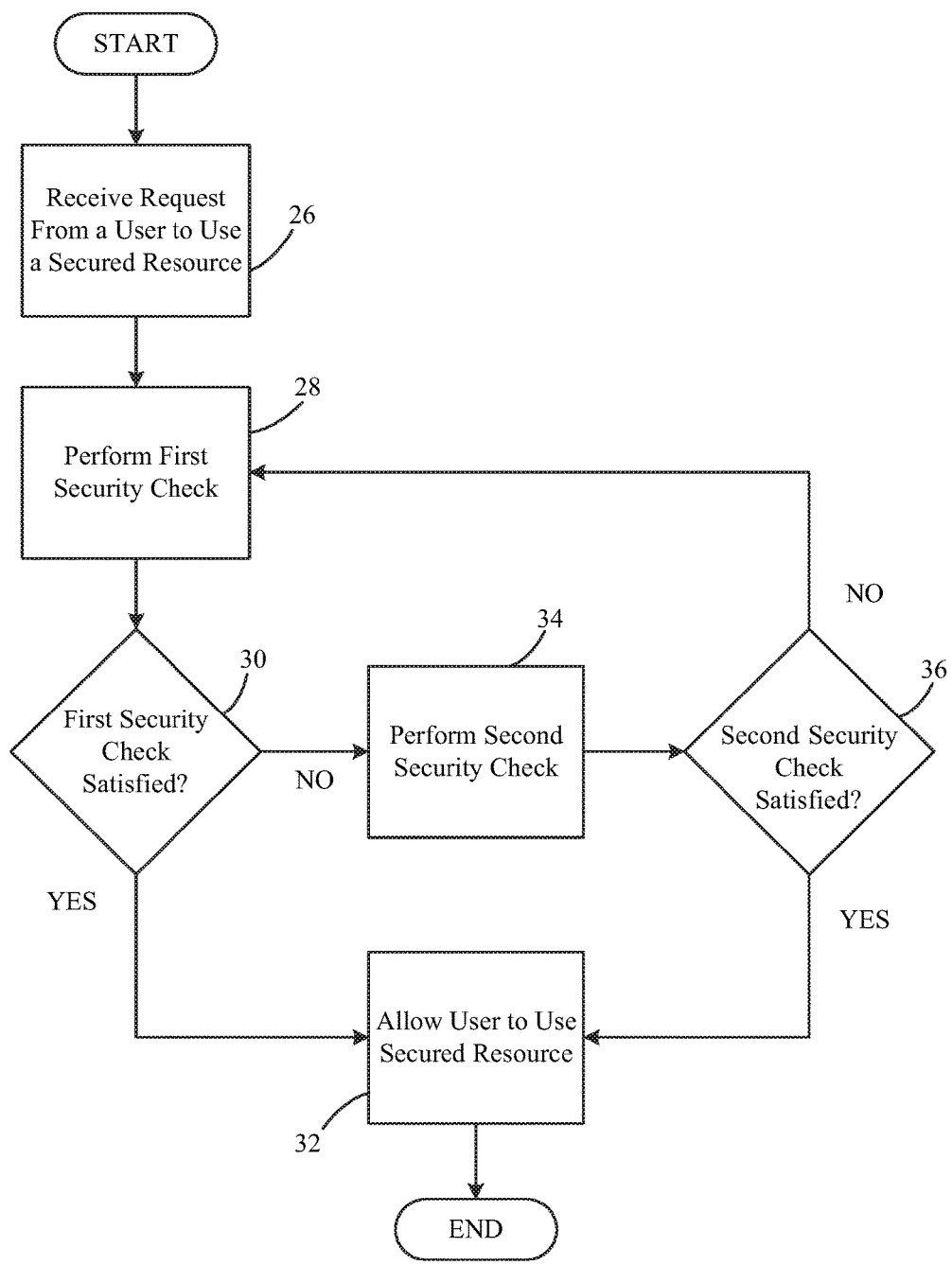
FIG. 2 is a process flow diagram of an example method that performs a first security check and a second security check, in accordance with embodiments of the present invention.

FIG. 2 is a process flow diagram of an example method that performs a first security check, in step 28, and a second security check, in step 34, in accordance with embodiments of the present invention. Embodiments illustrated in FIG. 2 relate to a user initially requesting access to a secured resource. For example, a user may request to access their mobile phone (an example secured resource). For example, a user may request to access data, tools, devices, security systems, vehicles, and/or any other kind of secured resource which desirably requires security authorization.

In embodiments, a security authorization system and/or security authorization protocol receives a request, in step 26, from a user to use a secured resource. In an example of a mobile phone as a secured resource, the request may be a request to invoke a touch command unlocking a touch screen. In an example of data as a secured resource, the request may be a request to invoke a computer interface command that makes data storage available to a user. In an example of a tool and/or device as a secured resource, the request may be a request to press an on switch of the tool and/or device. In an example of a security system as a secured resource, the request may be a request to invoke a lock and/or security keypad interface interaction that allows access to a facility. In an example of a vehicle as a secured resource, the request may be a request to interact with an automobile ignition switch. One of ordinary skill in the art would appreciate other type of actions by a user that would be a request to access a secured resource, in accordance with embodiments.

Upon receiving the request in step 26, a first security check, in step 28, is performed. In embodiments, the first security check may be an analysis of security circumstances of at least one of a user and/or a secured resource. For example, the first security check may be a determination of whether a user and/or secured resource are being accessed from a secured location (e.g. the user's home or office). As another example, the first security check may be a determination of a time lapse from the last time a secured resource was accessed by a user (e.g. a time out or lock out time window). The first security check may be any other kind of analysis of data points which would dynamically project the risk to a secured resource, in accordance with embodiments.

If a first security check is satisfied, in step 30, then, in step 32, the user is allowed to use the secured resource. Step 30 determines whether the first security check is satisfied. If step 30 determines that the first security check is satisfied (YES branch), then step 32 allows a user to use a secured resource. If step 30 determines that the first security step is not satisfied (NO branch), then step 34 performs the second security step. For example, if only a relatively short period of time has passed since the last time a user accessed a secured resource (e.g. the secured resource has not timed out), then a first security check may be satisfied. Since there is a dynamic determination that no further layers of security are needed and a projected risk of a secured resource being compromised is relatively low, then a user is allowed to access secured resource 32. In embodiments, the first security check may be satisfied by a user satisfying one or more security conditions. A user satisfying one or more security conditions may relate to circumstances of user and/or secured resource which do not require any action by the user, in accordance with embodiments. A user satisfying one or more security conditions may relate to authentication actions performed by a user (e.g. entering a password), in accordance with embodiments.

If the first security check is not satisfied, in step 30, then a second security check, in step 34, is performed, in accordance with embodiments. The second security check may include one or more second security conditions. The number of security conditions which may need to be satisfied by the second security check and may be dynamically determined based on a projected risk of unauthorized access to secured resource. For example, if the secured resource is a mobile phone in a crowded shopping mall (e.g. presumably an unsecure location and/or circumstance), then the second security check may require a multiple security conditions (e.g. both a password and a biometric input). The type of second security condition or conditions required by the second security check may likewise be determined based on a projected risk of unauthorized access to secured resource. For example, in a user's home a simple passcode may be the type of second security condition required, while in a crowded shopping mall a more secure (and more inconvenient) biometric input may be the type of second security condition required.

If the second security check is satisfied, in step 36, then the user is allowed to use the secured resource 32. If the second security check is not satisfied, then the user is not allowed to use the secured resource. In embodiments, if the second security check is not satisfied, then the first security check may be performed again, in step 28. Step 36 determines whether the second security check is satisfied. If step 36 is satisfied, then step 32 allows a user to use the secured resource. If step 36 is not satisfied, then step 28 performs the first security check.

Figure 3:
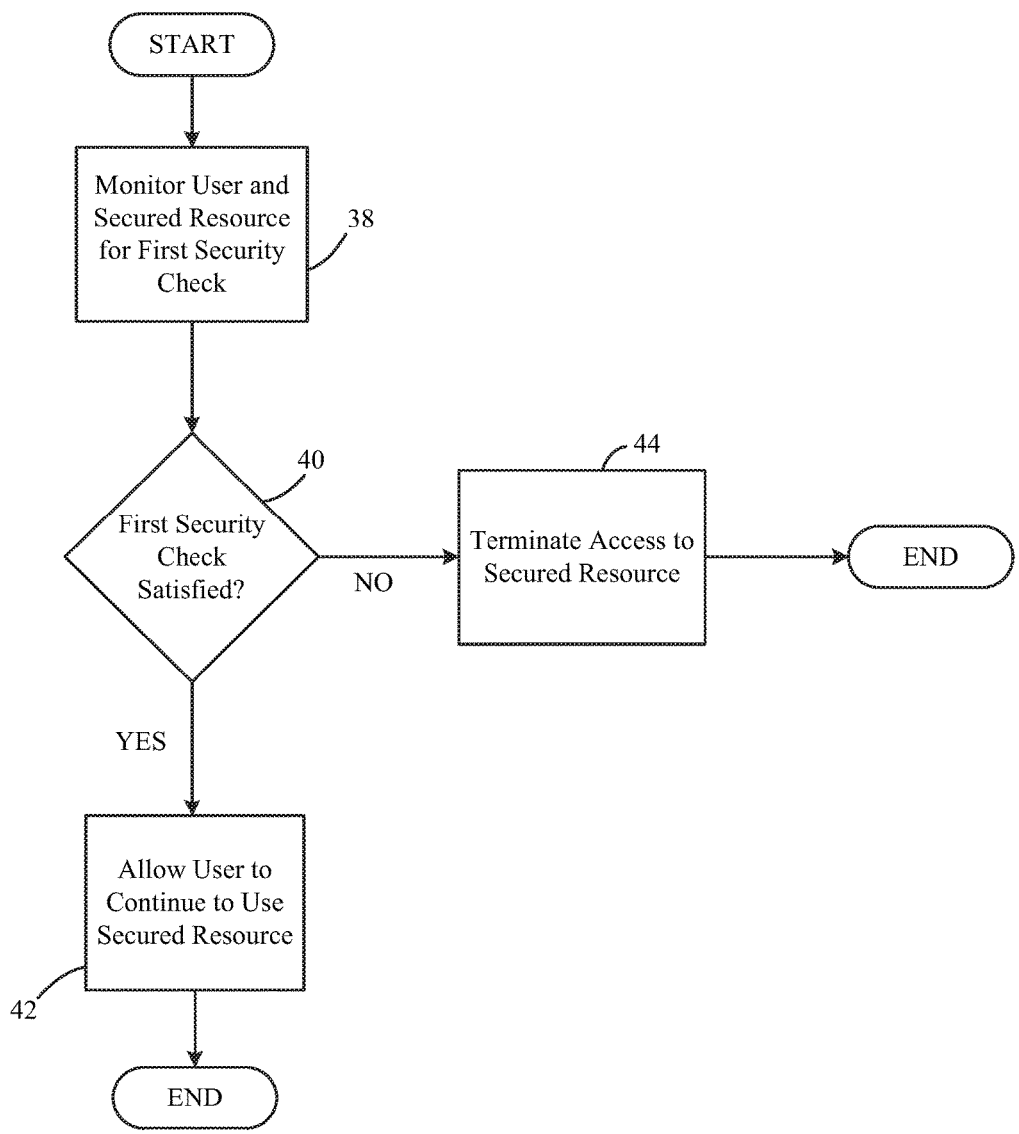
FIG. 3 is a process flow diagram of an example method that monitors a user and a secured resource using a first security check, in accordance with embodiments of the present invention.

FIG. 3 is a process flow diagram of an example method that monitors, in step 38, a user and a secured resource using a first security check, in step 40, in accordance with embodiments of the present invention. In embodiments, a security authorization and/or security protocol monitors a user and/or secured resource for a first security check, in step 38. If the first security check is satisfied, then the user is allowed to use the secured resource, in step 42. If the first security check is not satisfied, then the use of the secured resource is terminated, in step 44. Step 40 determines whether the first security check is satisfied. If step 40 is satisfied, then step 42 allows a user to continue to use the secured resource. If step 40 is not satisfied, then step 44 terminates access to the secured resource. In embodiments, circumstances of a user and/or secured resource may be monitored in the background. Data may be collected in the background related to violations of at least one security condition.

Figure 4:
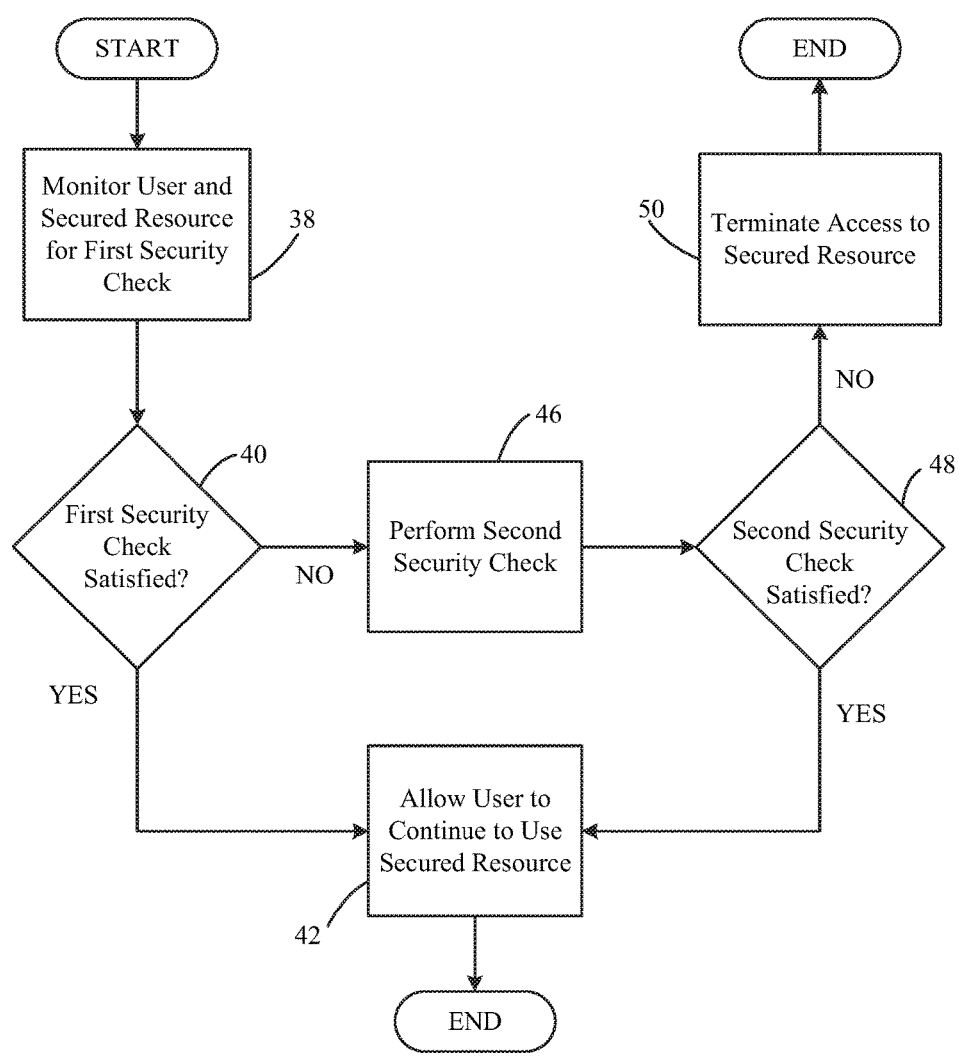
FIG. 4 is a process flow diagram of an example method that monitors a user and a secured resource using a first security check and a second security check, in accordance with embodiments of the present invention.

FIG. 4 is a process flow diagram of an example method that monitors a user and a secured resource using a first security check and a second security check, in accordance with embodiments of the present invention. In embodiments, a security authorization and/or security protocol monitors, in step 38, a user and/or secured resource for a first security check. If the first security check is satisfied, in step 40, then the user is allowed to use the secured resource, in step 42. If the first security check is not satisfied, then a second security check is performed, in step 46. If the second security check is satisfied, in step 48, then the user is allowed to continue to use the secured resource, in step 42. If the second security check is not satisfied, in step 48, then access to the secured resource is terminated, in step 50. Step 48 determines if the second security check is satisfied. If step 48 is satisfied, then step 42 allows the user to continue to use the secured resource. If step 48 is not satisfied, then step 50 terminates access to the secured resource.

Figure 5:
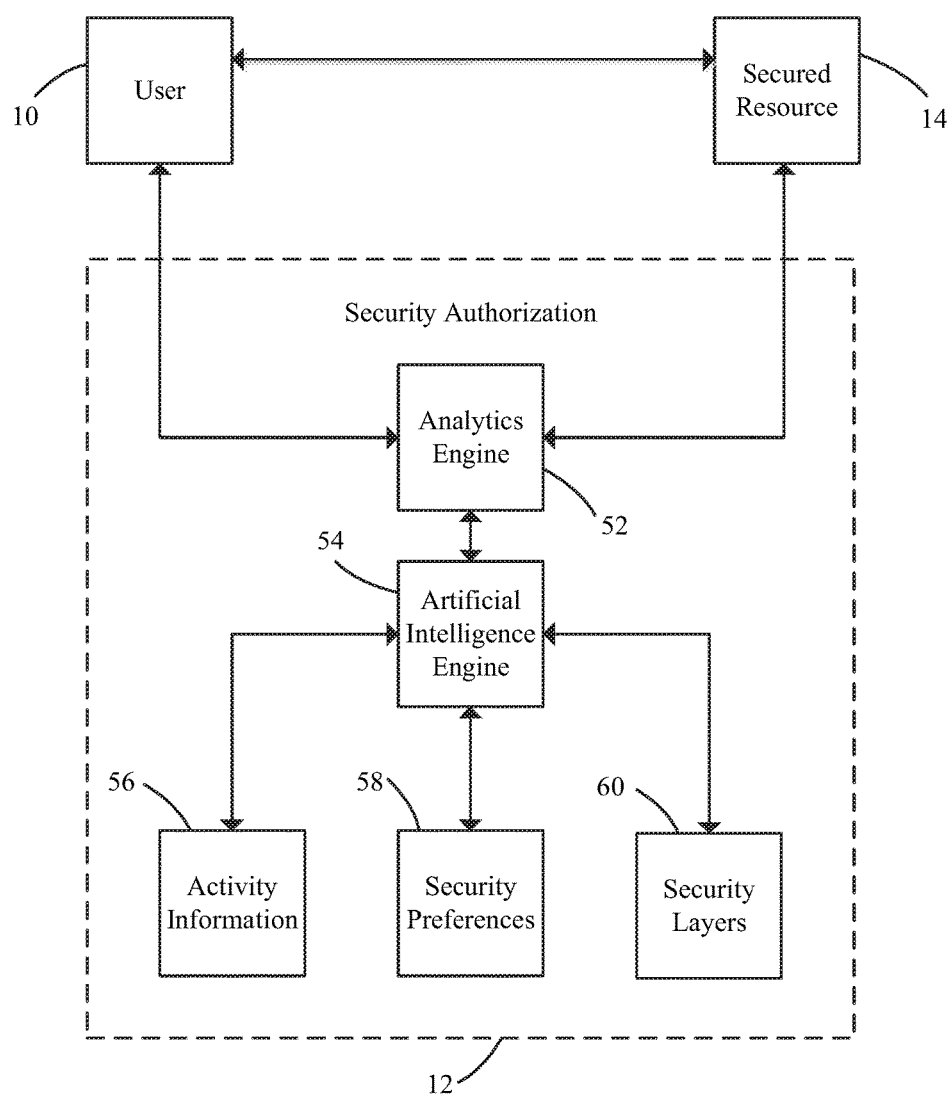
FIG. 5 illustrates a security authorization utilizing an analytics engine and/or an artificial intelligence engine, in accordance with embodiments of the present invention.

FIG. 5 illustrates security authorization 12 utilizing an analytics engine 52 and/or an artificial intelligence engine 54, in accordance with embodiments of the present invention. Analytics engine 52 may be part of security authorization 12, in accordance with embodiments. In embodiments, analytics engine 52 may perform a first security check when user 10 attempts to access secured resource 14. In other embodiments, analytics engine 52 may perform a first security check while user 10 is accessing secured resource 14. Analytics engine 52 may passively collect data points. Analytics engine 52 may collect any data points that may be any information that has any indication of the security circumstances of secured resource 14. In embodiments, data points collected by analytics engine 52 may be the conditions of a first security condition.

In embodiments, analytics engine 52 may collect data on the proximity or presence of peer devices. For example, data collected on the proximity or presence of peer devices may indicate the proximity or presence of a family member of user 10, a friend of user 10, a colleague of user 10, or any secondary device whose proximity may indicate a secure location. In embodiments, data points collected on the proximity or presence of peer devices may satisfy or violate a first security condition.

In embodiments, analytics engine 52 may collect data on a degree of separation of user 10 within a social network. For example, if user 10 is in relatively close physical proximity to people that are close friends as indicated by social media relationships (e.g. Facebook, Twitter, etc.), then that proximity may indicate a secure location. Likewise, if user 10 is in relatively close physical proximity to people that are not relatively close to user 10 based on social media relationships, then that proximity may indicate a less security location. In embodiments, data points collected on a degree of separation in a social network may satisfy or violate a first security condition.

In embodiments, analytics engine 52 may collect data based on a historic pattern of usage of user 10. Analytics engine 52 may perform a dynamic comparison of current usage with a historic pattern of use. For example, user 10 may regularly attend a social or business meeting at a regular time every week at a specific location, which can be information collected by analytics engine 52. Analytics engine 52 may be able to record over time the dates, places, and participants of such a social or business meetings and recognize them as regular patterns, which may indicate a relatively secure circumstance. Likewise, analytics engine 52 may also collect data that indicates aberrations in a historical pattern, which may indicate a less secure set of circumstances. For example, if the meeting is at a different time, location, or participants than usual based on data collected on historical usage, then analytics engine 52 may recognize this as a departure from historical usage, which may indicate a less secure set of circumstances. One of ordinary skill in the art may recognize any kind of data points that analytics engine 52 can dynamically collect that may indicate a historical pattern of use or an aberration from a historic pattern of use, which may be used as an indication of a secure or insecure circumstance. In embodiments, data points collected on a historical pattern of usage may satisfy or violate a first security condition.

In embodiments, a first security condition recognized by analytics engine 52 may be based on a historic pattern of usage that includes a dynamic comparison of current usage with a historic pattern of use. In embodiments, a first security condition recognized by analytics engine 52 may be based on either a location of user 10 or the location of a device used by user 10. In embodiments a first security condition recognized by analytics engine 52 may be based on a type of location, historical frequency of presence at a location, or a historical frequency of usage at the location.

In embodiments, a first security condition recognized by analytics engine 52 may be based on a type of network connection of a device used by user 10. For example, if a device used by user 10 is connected to a home or work internet connection, then analytics engine 52 may dynamically use those data points, which may indicate that user 10 is in a relatively secure location. However, if a device used by user 10 is connected to a mobile network or an internet connection that is publicly available (e.g. a Wi-Fi connection at a coffee shop), then analytics engine 52 may dynamically use that data point which may indicate that user 10 is in a relatively insecure location.

Data points dynamically collected by analytics engine 52 may be interpreted by artificial intelligence engine 54, in accordance with embodiments. Artificial intelligence engine 54 may perform a dynamic evaluation of at least one available data point and determined a projected security risk. Artificial intelligence engine 54 may be dynamic, as changes in circumstances of user 10 and/or secured resource 14 are dynamically changing. Since human behavior is not static and sometimes unpredictable, artificial intelligence engine 54 may not be able to effectively project risk to secured resource 14 on predetermined conditions. In embodiments, in order to compensate for the dynamic and unpredictable activities of user 10, artificial intelligence engine 54 may dynamically determine risk using artificial intelligence and/or other dynamic evaluation techniques. In embodiments, data points collected by analytics engine 52 may not be predefined and may be based on changes of available information which can be analyzed by analytics engine 52. Likewise, artificial intelligence engine 54 may be dynamically adaptive in order to project risk based on variances in data points collected by analytics engine 52, in accordance with embodiments.

In embodiments, projected security risk by artificial intelligence engine 54 may be based on activity information 56. Activity information 56 may be a dynamic evaluation of activity relating to user 10 and/or secured resource 14. Activity information 56 may include dynamic analysis of data collected by analytics engine 52 relating to the proximity or presence of peer devices. Activity information 56 may include dynamic analysis of data collected by analytics engine 52 relating to a degree of separation of user 10 within a social network. Activity information 56 may include dynamic analysis of data collected by analytics engine 52 relating to a historic pattern of usage of user 10. Activity information may include dynamic analysis of data collected by analytics engine 52 relating to a type of network connection of a device used by user 10. One of ordinary skill in the art would appreciate that any kind of activity information 56 may be dynamically used in cooperation with analytics engine 52 and/or artificial intelligence engine 54 in order to calculate a projected security risk of either user 10 and/or secured resource 14.

In embodiment, artificial intelligence engine 54 may project the risk to secured resource 14 based on security preferences 58. Security preferences 58 may be predefined rules set by user 10 or a system administrator, in accordance with embodiments. Security preferences 58 may be predefined preferences set by user 10 or a system administrator, in accordance with embodiments. For example, user 10 or a system administrator may determine what kinds of data points collected by analytics engine 52 may be used by artificial intelligence engine 54. As another example, security preferences 58 may be set by a user 10 or a system administrator to designate respective weights or degree of usage by artificial intelligence engine 54 for different categories of data points collected by analytics engine 52. One of ordinary skill in the art would appreciate other types of security preferences 58 which may be used by artificial intelligence engine 54 in order to dynamically project security risk of secured resource 14, in accordance with embodiments.

In embodiments, security preferences 58 may be set based on the sensitivity and/or consequences for a breach in security of secured resource 14. For example, security preferences 58 may be set to an overall lower level of security for a student's mobile phone (as an example secure resource 14) than for a business executive's mobile phone. Although both a student and business executive may desire to have artificial intelligence engine 54 to dynamically determine an appropriate level of security for their cell phones, the business executive may be more sensitive about unauthorized access to their mobile phone than a student, thus allowing a business executive to have an overall higher level of security preferences 58 than a student. Setting of security preferences 58 may also be set based on the personal preference and/or tolerance of user 10 for additional security layers. For example, different user's may have different tolerances for the inconvenience of security precautions versus the peace of mind that secure resource 14 will be uncompromised, which may be set by user 10 or a system administrator setting security preferences 58.

In embodiments, artificial intelligence engine 54 may set one or more security layers 60 based on the calculated projected risk to secured resource 14. Security layers 60 may cause a second security check to be performed on user 10 to allow access or continue to allow access to secured resource 14. Based on the calculated projected risk to secured resource 54, artificial intelligence engine 54 may impose one or more second security conditions. The one or more second security conditions may be one or more security layers 60. The types of the one or more security layers 60 may be determined based on a relative value of the projected risk calculated by artificial intelligence engine 54. For example, artificial intelligence engine 54 may determine that security layers 60 may include a password, a passcode, a fingerprint, a voice recognition sample, a retinal scan, biometric data, identifying picture contents, and/or any other type of security appreciated by one of ordinary skill in the art. If artificial intelligence engine 54 determines that the security risk is relatively high, the multiple security layers 60 may be required in order for user to access or continue to access secured resource 14.

Some security layers 60 are more inconvenient or intrusive than others. For example, a simple four digit passcode may be significantly less intrusive than a retinal scan or other biometric input. In embodiments, more intrusive and/or inconvenient security layers 60 may be selectively implemented based on the dynamically calculating the projected risk to secured resource 14 by artificial intelligence engine 54. In embodiments, a number of security layers may be dynamically determined by artificial intelligence engine 54 to be relatively high when the projected risk is determined to be relatively high, while the number of security layers may be dynamically determined by artificial intelligence engine 54 to be relatively low when the projected risk is determined to be relatively low.

In embodiments, artificial intelligence engine 54 may dynamically calculate the projected risk to secured resource 10 and designate a relative scaling factor. Selection and/or number of different security layers 60 may be triggered based on dynamically determined or predetermined thresholds that correlate the relative scaling factor to security layers 60, in accordance with embodiments. Since analytics engine 52 and/or artificial intelligence engine 54 dynamically calculate projected risk, embodiments relate to selection of security layers 60 based on artificial intelligence and/or algorithms without rigid parameters.

Some embodiments may include one, or more, of the following features, operations, characteristics and/or advantages: (i) receiving a request, from a user, to use a secured resource; (ii) before allowing the user to use the resource, performing a first security check, with respect to the user, to determine whether the user passes the first security check; (iii) on condition that the first security check is passed, starting to allow the user to use the resource; (iv) after starting to allow the user to use the resource, monitoring actions of the user and/or resource to determine whether a first security condition is met; (v) in response to the first security condition being met, performing a second security check; (vi) the first and secure security checks are different types of security that occur at differ security layers; (vii) the first security condition is based on at least one of the following types of security conditions: (a) proximity/presence of peer devices (spouses/friends/colleague's device, friend device, secondary device), etc., (b) degree of separation within social network (friend vs. friend of a friend), (c) historic pattern of usage—could consider if the pattern of usage differs from historic usage, and/or (d) type of network connection (home, work, external, etc.).

Some embodiments may include one, or more, of the following features, operations, characteristics and/or advantages: (i) dynamic because the system passively looks for certain predefined triggers (for example, location, proximity to other users, activity on device, etc.) and then selects the type and/or number of security layers based on those triggers occurring without requiring the user or system admin to manually apply based on static rules; and/or (ii) ability to dynamically evaluate available data points and calculate the projected risk and then select the security layers (number and type of layers), based on projected risk.

Figure 6:
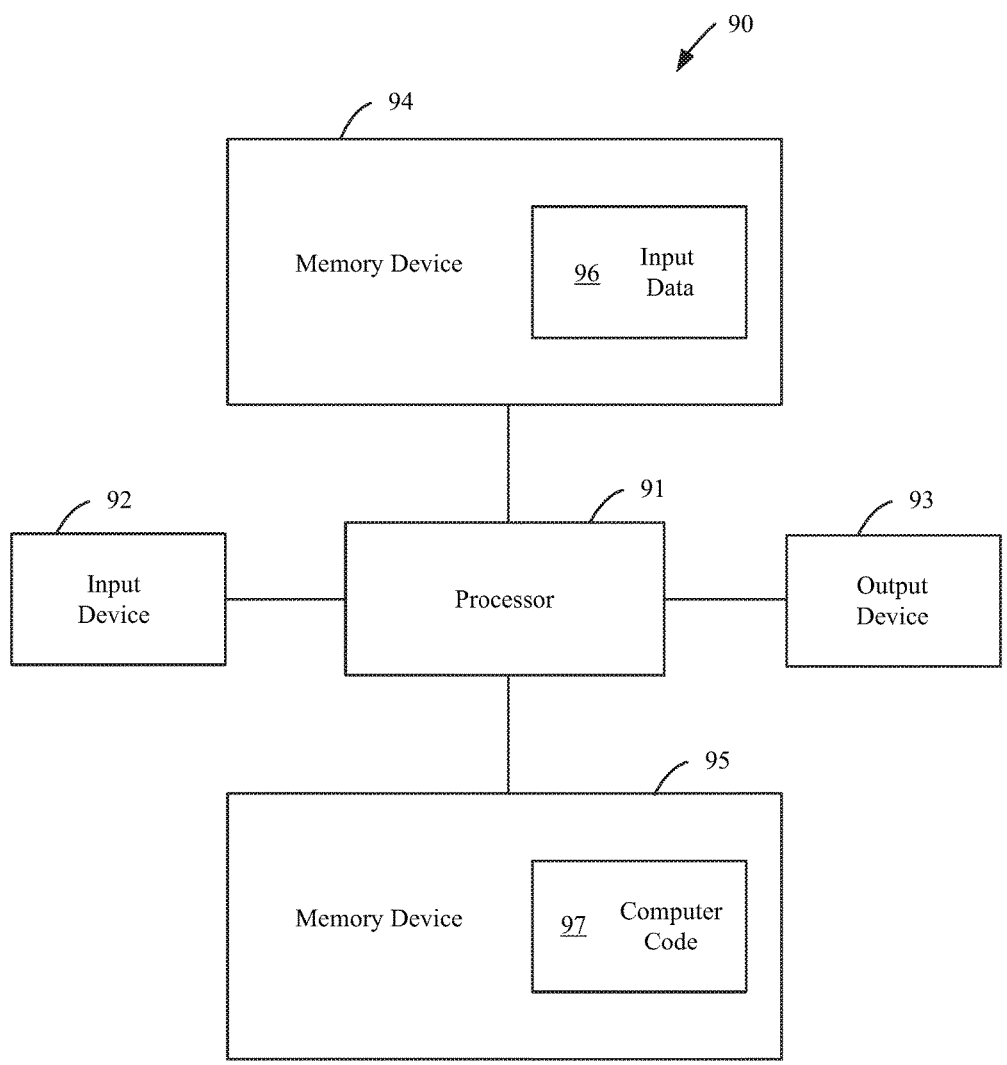
FIG. 6 illustrates a computer system used for implementing the methods of the present invention.

FIG. 6 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of embodiments may include one or more computer readable hardware storage devices having computer readable program code stored therein, said program code containing instructions executable by one or more processors of a computing system (or computer system) to implement the methods of the present invention.

A computing system (or computer system) of embodiments may include one or more processors, one or more memories, and one or more computer readable hardware storage devices, said one or more hardware storage devices containing program code executable by the one or more processors via the one or more memories to implement the methods of embodiments.

One concept involved in some embodiments of the present invention is the concept of context information, which is different and distinct from authentication information, as will now be explained. Authentication information is any type of information (now known or to be developed in the future) that users deliberately and purposely provide to computing systems in order to establish the user's identity and/or identity of an entity that authorizes the user to use, or continue using, a computing resource (for example, an internet based account, a hardware device, a software program). A simple example is when a user provides a fingerprint to use a smartphone computing device. Some embodiments of the present invention use context information, additionally or alternatively to authentication information. Context information, as that term is used herein, is any type of information (now known or to be developed in the future) that: (i) a computing system uses in order to establish the user's identity and/or identity of an entity that authorizes the user to use, or continue using, a computing resource (for example, an internet based account, a hardware device, a software program); and (ii) which context information is not deliberately and purposely provided to the computing system.

Various types of context information may include (but are not limited to) the following types: (i) visual; (ii) motion based; (iii) auditory; (iv) communicational; (v) computer usage type; (vi) weather based; (vii) radar, sonar or the like; (viii) global geographical; (ix) current events; (x) personal events; (ix) combinations of the forgoing types. Other types of context information would be appreciated by one of ordinary skill in the art without departing from the embodiments. These types will respectively be discussed in the following paragraphs.

Visual type context information would typically be collected by camera(s) built into a computing device and includes the following sub-types: (i) facial recognition, or lack thereof (so long as the image of the face is not deliberately provided by the user to establish identity or authorization); and/or (ii) other object recognition (for example, images of lush vegetation captured through the camera of a user who normally stays in a desert).

Motion-based type context information may be collected by motion sensing devices (such as accelerometers) built into a computing device and includes the following sub-types: (i) high impact or mechanical shock; (ii) large speed or acceleration (for example, speed indicative of a high speed train detected by a device of a user that would not normally be expected to be on a high speed train); (iii) vibrational patterns (for example, a vibrational pattern characteristic of a running burglar); and (iv) usage of a virtual reality hardware accoutrement (for example, a virtual reality glove detects that a user has clenched her fist and moved her arm in a manner indicative of wielding pepper spray).

Auditory-based type context information may be collected by microphone(s) built into a computing device and includes the following sub-types: (i) natural language content (context information detects that someone has said "give me the smartphone or else I will inflict pain upon you"); (ii) languages spoken (detection of an ambient conversation in a natural language not expected to be spoken in the user's usual proximity); (iii) pattern of loud/quiet (device of a user normally located in a quiet rural area starts experiencing constant relatively loud ambient noise); (iv) sounds as indicia of location (audio of a device of a user expected to be in the desert indicates a pattern of sound associated with ocean waves breaking upon rugged cliffs); and/or (v) sounds as indicia of suspicious activity (for example, detection of gunshot sounds).

Communicational type context information may be collected by software that performs and/or logs communications (for example, telephone calls, emails, text messages, video chats) performed by or through a computing device and includes the following sub-types: (i) content based (for example, a telephone call where one of the participants says "I think I am going to be robbed here," user sends a text message that says "I have just stolen a smartphone and am writing you this email through it"); (ii) languages used (detection of a communication made in a natural language not expected to be used by an authorized user of the device); (iii) identity of parties communicated with (for example, a telephone call made to a person under home incarceration for leading a smartphone theft ring); (iv) location of a party communicated with (telephone call to a jurisdiction with a large incidence of identity theft crimes) and (v) network locations communicated with (a device typically used by a young child browses through the site of the internet web site of the Department Of Motor Vehicles).

Computer usage type context information may be collected by software that performs and/or logs computer operations (for example, saving of various types of data, reading of various types of data, computation cycles used, identity of software programs invoked) performed by or through a computing device and includes the following sub-types: (i) hardware usage (for example, device of a user with a history of always using Bluetooth paired hardware suddenly is not using Bluetooth paired hardware); and (ii) software usage (a typically unused app starts being used).

Weather based may be collected by hardware that detects ambient weather conditions (for example, a thermometer) or location detecting software (like a GPS (global positioning system) device combined with data that maps current weather to various global locations.

Radar, sonar or the like type context information is probably not facilitated by current generation computing devices, but may become common such that it can support generation of context information for various embodiments of the present invention in the future.

Geographical type context information may be collected by location detecting software (like a GPS (global positioning system) and sub-types include: (i) local geography (for example, altitude, local terrain, locations within or over large bodies of water, etc.); and (ii) global geography (for example, a user's device is located in a city to which the user would not be expected to travel).

Current events type context information may relate to public or private news events which may be an indication of changes in security circumstances. An example of a public current event would be news of a major cyber attack on global computer networks, a terrorist attack, military actions, or any other public current event that would give context information that indicates a need for increased security precautions. An example of a private current event would be news of a breach of cyber security of a user's company, a suspicious business event (such as a hostile takeover), or any other private current event that would give context information that indicates a need for increased security precautions. A different between a public current event and a private current event is that a public current event may source information from public sources (e.g. newspapers), while a private current event may be non-public information (e.g. such as confidential information within a company or organization).

Personal event type context information may relate to personal information regarding an event of a user. For example, if a user is scheduled to be on a vacation, business trip, or any other calender event, this information may be give context information that indicates a need for increased security precautions. One of ordinary skill in the art would appreciate other examples of personal events that may be used as context information in accordance with embodiments.

As mentioned above, various types of context information inputs can be combined. For example, communication type information with geographical type information and further with auditory information to determine that it is suspicious that a user is placing a telephone call at 3:00 am (local time) and using a loud voice in the telephone conversation.

It is noted that the computer resource that is being secured, at least in part, through the use of context information, could be, or include a robot. Tasks/commands to a robot need be authenticated as coming from an authorized source. Context information in the context of robots may include the following types of context information: what action is being requested; and/or the surrounding conditions (this is discussed in more detail above).

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method of accessing a secured resource, comprising:
monitoring activity of a user;
storing, by one or more processors of a computer system, a historical record including a historical pattern of activity of a user, wherein said historical record is updated based on said activity of said user;
receiving, by the one or more processors, a request from said user to access a secured resource;
performing, by the one or more processors, a first security check with respect to said user to determine whether a first security protocol is satisfied by the user in order to be permitted to access the secured resource;
allowing, by the one or more processors, the user to access the secured resource in response to a determination that the first security check is satisfied by the user;

conducting, by the one or more processors, a comparison of current activity of said user with the historical record of said user;

deriving, by the one or more processors, a risk factor based on said comparison;

performing, by the one or more processors, based on said risk factor, a selection process for selecting from a plurality of additional security choices a second security check with respect to said user to determine whether a second security protocol is satisfied by the user in order to be permitted to continue to access the secured resource, said second security check being selected from said plurality of additional security choices based on a relative scaling factor related to said risk factor;

allowing, by the one or more processors, the user to continue to access the secured resource in response to a determination that the second security condition is satisfied by the user.

2. The method of claim 1, further comprising:

changing, by the one or more processors, said second security protocol based on said risk factor by applying said scaling factor to select both a number of additional security layers and a type of additional security layers, where both said number and said type are chosen from said plurality of additional security choices based on said risk factor.

3. The method of claim 1, wherein the secured resource is at least one of data, at least one tool, at least one device, at least one application, a security system, or a vehicle.

4. The method of claim 1, wherein the second security protocol is based on an evaluation of at least one data point stored in said historical record to calculate said risk factor of the user.

5. The method of claim 4, wherein the evaluation evaluates the at least one data point stored in said historical record collected to determine the risk factor based on at least one of predefined rules or predefined preferences of at least one of a system administrator or the user.

6. The method of claim 5, wherein the at least one data point is passively collected by an analytics engine.

7. The method of claim 3, further comprising:

in response to the user failing to satisfy the first security check, performing, by the one or more processors, said second security check on the user with said second security protocol; and in response to the user passing the at least one second security protocol, allowing, by the one or more processors, the user to access the secured resource, wherein the second security protocol comprises more than two additional security layer depending on the risk factor of the user using the security resource based on the comparison.

8. The method of claim 7, comprising dynamically adjusting a number of security layers of the second security protocol when the risk factor is relatively high to be greater than a number of security layers of the at least one security layer when the risk factor is relatively low.

9. The method of claim 7, wherein the second security protocol prompts the user for at least one of a password, passcode, fingerprint, voice recognition sample, retinal scan, biometric data, or identifying picture contents.

10. The method of claim 1, comprising:

in response to a determination that the at least one first security protocol is satisfied, monitoring, by the one or more processors, the activity of the user for a change in said risk factor.

11. The method of claim 10, comprising:

in response to a determination that the monitoring the activity of the user causes a change in said risk factor, terminating, by the one or more processors, the user's use of the secured resource.

12. The method of claim 10, comprising:

in response to a determination that the monitoring the activity of the user causes a change in said risk factor, performing, by the one or more processors, said second security check on the user.

13. The method of claim 12, wherein a change in said risk factor is caused by an actual activity of the user that is different than a recorded activity of the user.

14. The method of claim 10, wherein the monitoring the activity of the user for a change in said risk factor comprises collecting data in the historical record related to a violation of the first security condition.

15. The method of claim 1, wherein the first security protocol is based on at least one of a proximity and a presence of peer devices.

16. The method of claim 15, wherein the proximity or presence of peer devices includes the ability to detect at least one of said proximity or presence of at least one of:

a family member of the user;

a friend of the user;

a colleague of the user; or a secondary device whose proximity indicates a secure location.

17. The method of claim 1, wherein the historical record comprises data including past locations of said user, a social network of said user, and a degree of separation of said user from said social network.

18. The method of claim 1, wherein the first security protocol is based on at least one of historical locations of the user or historical locations of a device used by the user.

19. The method of claim 18, wherein the first security protocol is based on at least one of a type of the location, historical frequency of presence at the location, or a historical frequency of usage at the location.

* * * * *